(No Model.)

J. H. BORTON.
Grain Deflector for Harvester Binders.

No. 236,202. Patented Jan. 4, 1881.

Witnesses
F. B. Townsend
James Cameron

Inventor:
Job H Borton
per Merriam & Whipple
Attorneys

UNITED STATES PATENT OFFICE.

JOB H. BORTON, OF WEST UNITY, OHIO, ASSIGNOR TO McCORMICK HARVESTING MACHINE COMPANY, OF CHICAGO, ILLINOIS.

GRAIN-DEFLECTOR FOR HARVESTER-BINDERS.

SPECIFICATION forming part of Letters Patent No. 236,202, dated January 4, 1881.

Application filed May 17, 1880. (No model.)

*To all whom it may concern:*

Be it known that I, JOB H. BORTON, a citizen of the United States, residing at West Unity, in the county of Williams and State of Ohio, have invented certain new and useful Improvements in Grain-Deflectors for Harvester-Binders, of which the following is a specification.

My improvements relate to grain-deflectors to be used in connection with automatic binders; and the objects are to bring the grain to the binder in good shape for nice sheaves, and at the same time have the deflector adjustable with the binding or gaveling arm in adapting it to long and short grain. I attain these objects by means of a deflector made in two parts, one part being secured to the harvester and stationary, and the other part being secured to the adjustable frame which carries the binder, and movable therewith. Such deflector and the manner of securing it to the harvester and adjustable frame of the binder are illustrated in the accompanying drawings, in which—

Figure 1:
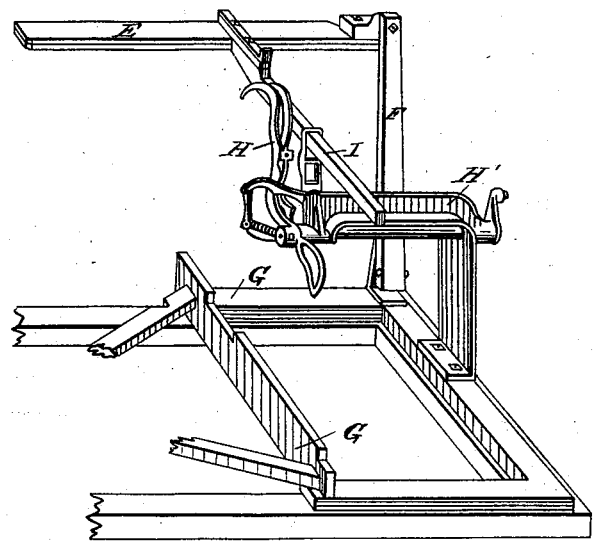
Figure 2:
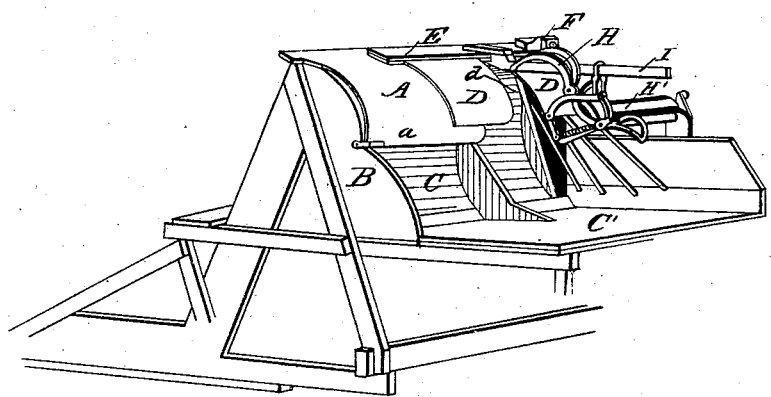

Figure 1 is a perspective view of the adjustable binder-frame, to which the movable part of the deflector is secured; and Fig. 2 is a perspective view of both parts of the deflector and the adjacent parts of the harvester and binder.

Similar letters of reference refer to similar parts in both figures.

A is the stationary part of the deflector, secured to the harvester at the top of the frame B, which supports the upper end of the grain-elevator. The rear outer corner, *a*, of this part of the deflector is curved or bent in toward the grain-chute C, so as to narrow the passage-way between the deflector and chute at that point to check the head or heavier end of the grain and keep it even with the butt or lighter end in the descent of the grain along the chute to the grain-receiver C', in order that it may be delivered upon the receiver square and in good shape for forming the sheaves.

D is the adjustable part of the deflector, provided with a slot, *d*, for the binding-arm to work in. This part is secured along its upper edge to the deflector-support E, which is attached to and carried by an upright bar, F. This bar is secured at its lower end to the frame G, which slides back and forth under the receiver and carries the binding-arm H, supported by the overhanging arm H'.

I is an arm secured to the deflector crosswise to afford it lateral support.

In adjusting the binding-arm laterally, so as to bring the band around the bundle about midway of the length of the grain, the adjustable part of the deflector moves with the binding-arm, sliding on top of the other part, and so keeps the slot *d* always in proper position with reference to the binding-arm. The stationary part is shorter than the other part; but it should not be so long as to interfere with the binding when it is adjusted to its utmost limit of adjustment toward the stationary part, nor so short as to leave an opening between the two parts of the deflector when the binding-arm is moved to its utmost limit of adjustment in the contrary direction.

The deflector is made of sheet-iron or other suitable thin material, and there is sufficient space between the bar F and the adjacent side of the machine to allow the movement necessary for the adjustment of the deflector, which projects on this side so as to cover the elevator-canvas at all times of adjustment.

Having thus described my invention, what I claim, and desire to secure by Letters Patent, is—

1. In a harvester-binder, the combination, with the elevator-frame, binder-arm, and adjustable binder-frame, of the grain-deflector composed of two portions, one portion containing a slot for the passage of the binder-arm and secured to the adjustable binder-frame, and the other portion secured to the elevator-frame, substantially as and for the purpose described.

2. The grain-deflector composed of two portions, as described, in combination with the grain-chute, the outlet for the grain between said deflector and chute being contracted at its rear portion, substantially as and for the purpose set forth.

JOB H. BORTON.

Witnesses:
DAVID M. WEBB,
JOHN H. McINTIRE.